(12) United States Patent
Brodersen et al.

(10) Patent No.: US 7,865,927 B2
(45) Date of Patent: Jan. 4, 2011

(54) ENHANCING MEDIA SYSTEM METADATA

(75) Inventors: Rainer Brodersen, San Jose, CA (US); Rachel Clare Goldeen, Mountain View, CA (US); Mihnea Calin Pacurariu, Los Gatos, CA (US); Jeffrey Ma, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 111 days.

(21) Appl. No.: 11/549,103

(22) Filed: Oct. 12, 2006

(65) Prior Publication Data
US 2008/0066100 A1 Mar. 13, 2008

Related U.S. Application Data

(60) Provisional application No. 60/825,242, filed on Sep. 11, 2006.

(51) Int. Cl.
H04N 7/173 (2006.01)
(52) U.S. Cl. .................. 725/109; 725/19; 725/53
(58) Field of Classification Search ............. 725/24, 725/32, 37–61, 105–142, 19; 348/161, 526
See application file for complete search history.

(56) References Cited

U.S. PATENT DOCUMENTS

| | | | |
|---|---|---|---|
| 5,621,456 A | 4/1997 | Florin et al. | |
| 5,880,768 A | 3/1999 | Lemmons et al. | |
| 5,933,811 A | 8/1999 | Angles et al. | |
| 6,216,264 B1 | 4/2001 | Maze et al. | |
| 7,240,075 B1* | 7/2007 | Nemirofsky et al. | 348/14.03 |
| 7,340,760 B2 | 3/2008 | Wachtfogel et al. | |
| 7,363,591 B2 | 4/2008 | Goldthwaite et al. | |
| 7,367,042 B1 | 4/2008 | Dakss et al. | |
| 2002/0042920 A1* | 4/2002 | Thomas et al. | 725/87 |
| 2002/0042923 A1* | 4/2002 | Asmussen et al. | 725/92 |
| 2002/0059633 A1* | 5/2002 | Harkness et al. | 725/108 |
| 2002/0083469 A1 | 6/2002 | Jeannin et al. | |
| 2002/0162118 A1* | 10/2002 | Levy et al. | 725/110 |
| 2002/0178447 A1 | 11/2002 | Plotnick et al. | |
| 2003/0005445 A1 | 1/2003 | Schein et al. | |
| 2003/0070167 A1 | 4/2003 | Holtz et al. | |
| 2003/0149975 A1 | 8/2003 | Eldering et al. | |
| 2004/0221243 A1 | 11/2004 | Twerdahl et al. | |
| 2004/0221308 A1 | 11/2004 | Cuttner et al. | |
| 2004/0250217 A1 | 12/2004 | Tojo et al. | |

(Continued)

FOREIGN PATENT DOCUMENTS

GB EP 1289287 3/2003

(Continued)

OTHER PUBLICATIONS

International Search Report and Written Opinion, PCT/US2007/076076; Dated Apr. 27, 2009.

(Continued)

*Primary Examiner*—Scott Beliveau
*Assistant Examiner*—Michael Telan
(74) *Attorney, Agent, or Firm*—Fish & Richardson P.C.

(57) ABSTRACT

Systems and methods for providing enhanced metadata to a user. Systems and methods can include extraction of data from metadata and searching for related metadata based upon the the extracted data.

28 Claims, 11 Drawing Sheets

U.S. PATENT DOCUMENTS

| | | | |
|---|---|---|---|
| 2005/0060741 A1* | 3/2005 | Tsutsui et al. | 725/32 |
| 2005/0120148 A1* | 6/2005 | Jung et al. | 710/29 |
| 2005/0216932 A1 | 9/2005 | Danker | |
| 2006/0020962 A1 | 1/2006 | Stark et al. | |
| 2006/0074769 A1 | 4/2006 | Looney et al. | |
| 2006/0090185 A1 | 4/2006 | Zito et al. | |
| 2006/0265409 A1 | 11/2006 | Neumann et al. | |
| 2007/0174872 A1* | 7/2007 | Jing et al. | 725/46 |
| 2008/0065638 A1 | 3/2008 | Brodersen et al. | |
| 2008/0066099 A1 | 3/2008 | Brodersen et al. | |

FOREIGN PATENT DOCUMENTS

| | | |
|---|---|---|
| WO | WO 00/33573 | 6/2000 |

OTHER PUBLICATIONS

Mystrands, Inc., Mystrands Discovery for Windows: Internet Citation, XP002391686; www.mystrands.com, Jul. 24, 2006.

USPTO Interview Summary, U.S. Appl. No. 11/530,643, filed Apr. 28, 2009.

USPTO Non-Final Office Action in U.S. Appl. No. 11/530,643, mailed Nov. 14, 2008.

Fish & Richardson P.C., Amendment in Reply to Action dated Nov. 14, 2008 in U.S. Appl. No. 11/530,643 filed Mar. 16, 2009.

USPTO Intervew Summary, U.S. Appl. No. 11/549,092, filed Apr. 21, 2009.

USPTO Non-Final Office Action in U.S. Appl. No. 11/549,092 mailed Feb. 9, 2009.

Fish & Richardson P.C., Amendment in Reply to Action dated May 11, 2009 in U.S. Appl. No. 11/549,092.

* cited by examiner

ENHANCING MEDIA SYSTEM METADATA

BACKGROUND

This disclosure relates to providing metadata to a media device.

Historically, video content for television was free broadcast video content. The revenue model for content providers was to sell advertising during the free broadcast content. The advent of cable television systems has significantly changed the business mode for content providers in many instances. For example, content providers such as Home Box Office (HBO), available from Home Box Office, Inc. of New York, N.Y., provide broadcast content by subscription service and reduce (or altogether eliminate) advertising. Thus, the primary source of revenue for such providers are subscription services. Such subscription content can be broadcast to numerous set-top boxes, and the set-top box can be provided keys for decrypting the subscription broadcast signal.

Further, with the implementation of digital technology in most cable and satellite systems, the broadcast content is supplemented by metadata content. The metadata content can be provided by a metadata content provider on a sideband signal to the digital video content signal, or by another alternative mechanism. The metadata content can enable electronic program guides, which can provide media system 100 users with programming schedules and detailed program information, such as, for example, actors, directors, ratings, reviews, etc. In conventional systems, such metadata content is limited.

SUMMARY

In one aspect systems, methods, apparatuses, and computer program products are disclosed for media systems. Such systems can include a video input, a metadata input, a network interface and a search engine. The video input can be configured to receive video content, while the metadata input can be configured to receive metadata from a metadata provider, the metadata being associated with the video content. The search engine interface can be configured to extract or automatically develop data from the metadata based upon input (e.g., user imputer), search a network using the network interface for data related to the extracted data, and to use the network interface to pull supplemental program data from the network.

In one aspect, methods are disclosed which provide supplemental metadata, for example: receiving metadata associated with currently selected video content; extracting search parameters from the received metadata; and, searching a network for supplemental program data based upon the extracted search parameters.

Media systems and methods described herein can provide supplemental information to content being presented either automatically or based upon user input, thereby allowing the user to locate information about the content that may be of interest.

Media systems and methods can also provide entertainment to users in the form of, for example, commentaries, bonus footage, interactive trivia, pop-up trivia tidbits about content being presented to the user, and other data.

DETAILED DESCRIPTION

Figure 1:
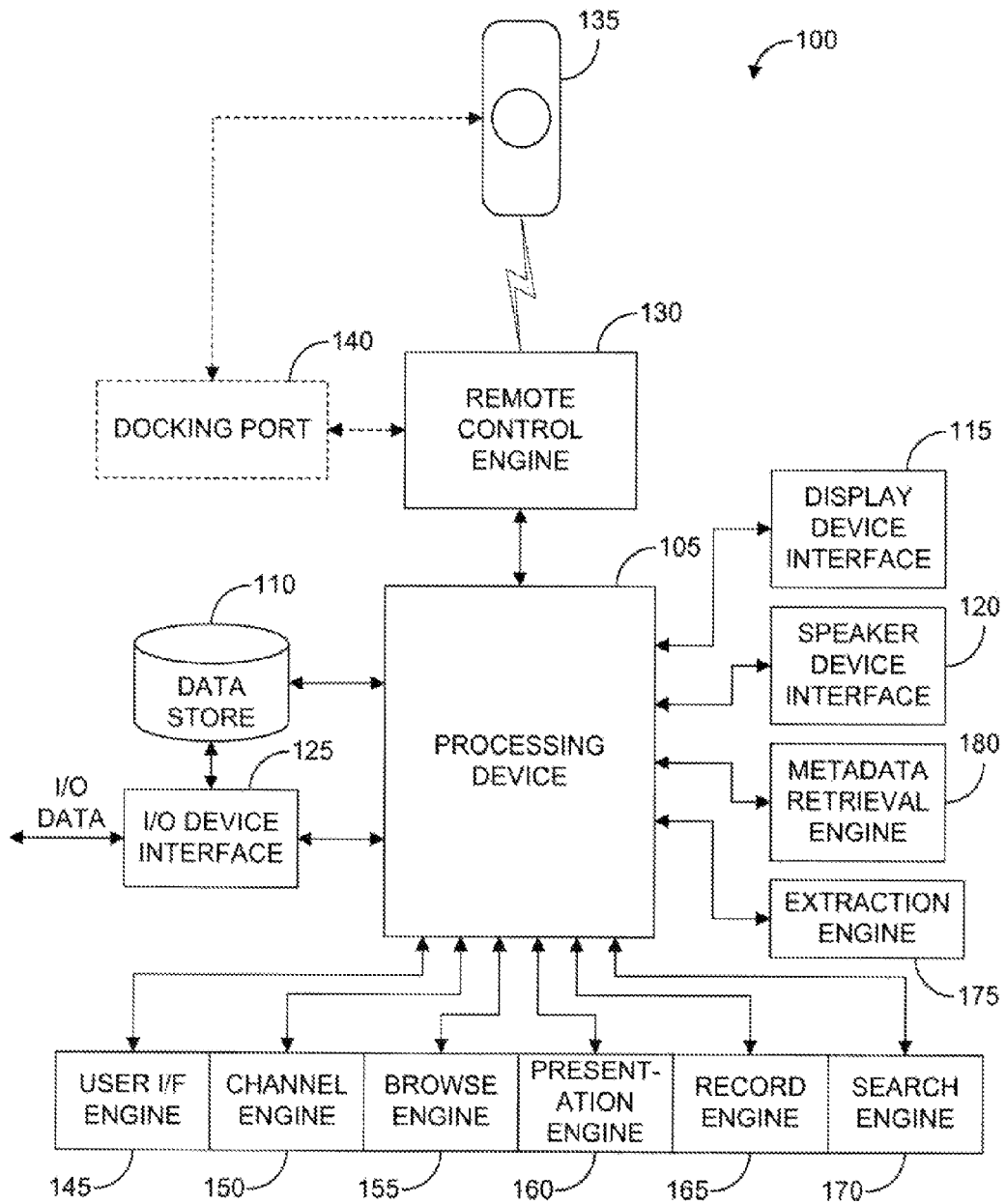
FIG. 1 is a block diagram of an exemplary media system having a network search interface used to search for related metadata.

FIG. 1 is a block diagram of a media system 100. Media systems 100 of various implementations can include a set-top box with or without a digital video recorder (DVR) (or, personal video recorder (PVR)). In other example implementations, a display with built-in functionality (e.g, a television), a computer system, a phone, a PDA, an iPOD® (available from Apple Computers, Inc. of Cupertino, Calif.), or any other media environment. In other implementations, subsets of the functionality shown in FIG. 1 could be included in a media card for insertion into a display device. Media systems 100 can be used to connect a media environment to a video content provider, such as a cable service provider, for example.

In the example of FIG. 1, the media system 100 includes DVR functionality. The media system 100 can include, for example, a processing device 105, a data store 110, a display interface 115, a speaker interface 120, and other input/output (I/O) device interfaces 125, through which I/O data can be received or transmitted. I/O devices of various examples can include a network interface from an internet service provider (ISP) for example, an external hard drive, a power supply, a keyboard, a DVD player and/or recorder, a receiver, etc. The above list is not intended to be exhaustive, but merely provide a few examples of the functionality that can be provided using various I/O devices. In various examples, the media system 100 can include network storage of an alternative data feed in place of, or in addition to the data store 110.

In one implementation, the functionality of the media system 100 is distributed across several engines. For example, the media system 100 may include a remote control engine 130, a user interface (UI) engine 145, a channel engine 150, a browse engine 155, a presentation engine 160, a recording engine 165, a search engine 170, an extraction engine 175, and a metadata retrieval engine 180. The engines may be implemented in software as software modules or instructions, hardware, or in a combination of software and hardware. The software can be stored in a data store (e.g., data store 110, flash memory, external memory, read-only memory (ROM), nominally powered volatile memory, etc.) during periods in which the media system 100 is in a standby mode. Upon power up, the software is communicated to the processing device. 105. The processing device 105 then executes the software by performing the commands implicated by the software.

In some implementations of media systems 100, the I/O device interface 125 operates a hardware component operable to receive signals from a remote control 135, which can be routed through the remote control engine 130 to process the received signals. However, for clarity, FIG. 1 shows the remote control 135 being connected to the system using the remote control engine. As such, the remote control engine 130 of FIG. 1 can include hardware which enables the media system 100 to communicate with the remote control 135. The remote control engine 130 can also include software used to decode signals and provide commands from the user to any of a number of other engines being executed by the processing device 105.

Numerous types of protocols and physical media can provide a communication link between the remote control 135 and the remote control engine 130, including, among others, radio frequency (RF) media, infrared (IR) media, and wired media.

Some media system 100 implementations can include a docking port 140. The docking port can provide a wired or wireless communication connection between the remote control 135 and the remote control engine 130. In some examples, the remote control 135 itself is a handheld personal media device operable to receive, store and playback audio and/or video, such as, for example, an iPOD®, available from Apple Computer, Inc., of Cupertino, Calif. As such, the docking port can provide a mechanism by which a user can manage any downloaded content (e.g., audio and/or video content) stored in volatile or non-volatile memory of the handheld personal media device.

The user interface engine 145 operates in conjunction with the processing device and provides a graphical user interface to the user through a display device interface. The graphical user interface can provide the user with a number of interactive menus that can be selectively navigated by a user. An example of a menu implementation can include an electronic program guide or interactive program guide. Electronic program guides can offer a user the ability to view a list of scheduled programs, as well as read information about the programs, set a DVR to record various programs, set reminders for programs, search for upcoming programs, etc. Other menu implementations can include program information which can be accessed while watching a program.

Program information can be obtained using a metadata content provider, such as for example, Tribute TV Data, available from Tribune Media Services, Inc., of Chicago, Ill., or Gemstar TV guide, available from Gemstar-TV Guide International, Inc., of Los Angeles, Calif. The metadata can be pushed or pulled from the metadata content provider. Many DVR systems operate using a system whereby the metadata is periodically sent to the DVR using the same broadcast transport stream as the video content data or on a data stream alongside the broadcast transport stream. However, there are many ways to disseminate the metadata information, including using an internet connection, which can be a dedicated connection or multi-purpose connection.

A channel engine 150 operates in conjunction with the processing device 105 and the user interface engine 145 to provide information (e.g., an electronic program guide or channel information) to a user. The channel engine 150 can collect metadata information and associate the metadata information with a particular channel or program.

The media system 100 further includes a browse engine 155. The browse engine 155 in conjunction with the processing device 105, the user interface engine 145 and the channel engine 150 operate to enable the user to browse through an electronic program guide or a reduced program guide. The browse engine 155 can interact with the channel engine 145 to locate metadata for currently browsed channels. The browse engine 155 can provide the framework, including for example channel slots and time slots, into which metadata from the channel engine 150 can be inserted. This framework can then be sent to an output display using the user interface engine 145.

The media system 100 of FIG. 1 can also include a presentation engine 160. The presentation engine 160 in conjunction with the processing device 105 controls the presentation of a content to the user. The presentation engine 160 can decode a broadcast data stream and provide the content to a display device interface 115, a speaker device interface 120, or combinations thereof. The presentation engine 160 can provide the content in a number of formats. For example, the presentation engine 160 can provide a component video stream to the display device interface 115, a composite video stream to the display device interface 115, a 5.1 channel signal in Dolby Digital or DTS format, or other video or audio streams.

The media system 100 of FIG. 1 also includes a recording engine 165. The recording engine 165 in conjunction with the processing device 105 operates to manage recording of audio and/or video content. In some implementations the recording engine 165 can include various routines used to interface with the user to schedule recordings, track disk space, automatically maintain and delete recordings based on user input received using the user interface. In some implementations, recording engine 165 includes tools to erase programs when more space is needed, or to alert the user when space is low. These and other types of features can be facilitated by the recording engine 165.

The media system 100 of FIG. 1 also includes a search engine 170. The processing device 105 executes the search engine 170 and thereby enables users to search, for example, among the metadata content received from the metadata provider, as described above. The search engine 170 can allow users to enter search parameters using the user interface engine 145. The search engine 170 can use the input parameters to search from among the metadata content stored in the data store. There are many searching algorithms that can be used to perform a search from among a collection of data, including list searches, tree searches, etc. Selection of a particular search algorithm can be, for example, dependant on the data structure used to store the metadata or by the processing power included in the processing device.

The media system 100 can also include an extraction engine 175. The extraction engine 175 is executed by the processing device 105 and extracts data from the metadata content either automatically or based upon various parameters requested by the user. The extracted data can be used to perform a search for metadata content related to video content or audio content currently being presented to the user, or related to selected metadata or customized requests received from the user. In some implementations, the search can be executed using a network such as the internet.

In some implementations, the user can choose a predefined search template to determine which of the data is to be extracted from the metadata content. The predefined search template, in various example, can cause the extraction engine 175 to extract data such as actors, artists, directors, producers, writers, genre, or combinations thereof, among others.

The media system 100 can also include a metadata content retrieval engine 180. The metadata content retrieval engine 180 is executed by the processing device 105 and receives the extracted data from the extraction engine 175. The metadata content retrieval engine 180 uses the extracted metadata to search for additional metadata content using, for example, a network interface. For example, additional metadata can include supplemental program descriptions, expounding upon the summary description provided by conventional metadata providers, reviews, or other related metadata content. Other types of metadata that can be retrieved can include, among many others: outtakes; biographical information about the actors, director(s), etc.; commentaries from actors, director(s), producer(s), etc.; bonus footage (e.g., deleted scenes, alternative endings, etc.); and trivia content.

In some example implementations, advertising content can have associated metadata. In such implementations, media systems 100 can examine metadata associated with the advertising content and cause a search to be performed for metadata related to the advertising content.

In various implementations, metadata content providers can include formal metadata libraries such as iTunes, available from Apple, Inc., of Cupertino, Calif., imdb.com and/or amazon.com, both available from Amazon.com, Inc., of Seattle, Wash., or netflix.com, available from NetFlix, Inc., of Los Gatos, Calif., among many others, and combinations thereof. In other implementations, metadata content providers can include informal metadata libraries, such as peer-to-peer networks, central servers housing user submitted metadata (e.g., wiki sites), social networking sites, etc. Using these informal sites, users may choose to communicate recommendations, ratings, reviews, trivia, etc. to other users. Informal and formal sites may also include content recommendations and/or ratings from celebrities, critics, etc. Moreover, the content recommendations, in some examples, can be tailored based upon the user's previously stated preferences (e.g., stored content ratings).

The media processing system 100 of FIG. 1 can also implement different functional distribution architectures that have additional functional blocks or fewer functional blocks. For example, the channel and recording engines 150 and 165 can be implemented in a single functional block, and the browse and search engines 155 and 170 can be implemented in another functional block. Alternatively, all of the engines can be implemented in a single monolithic functional block.

Figure 2:
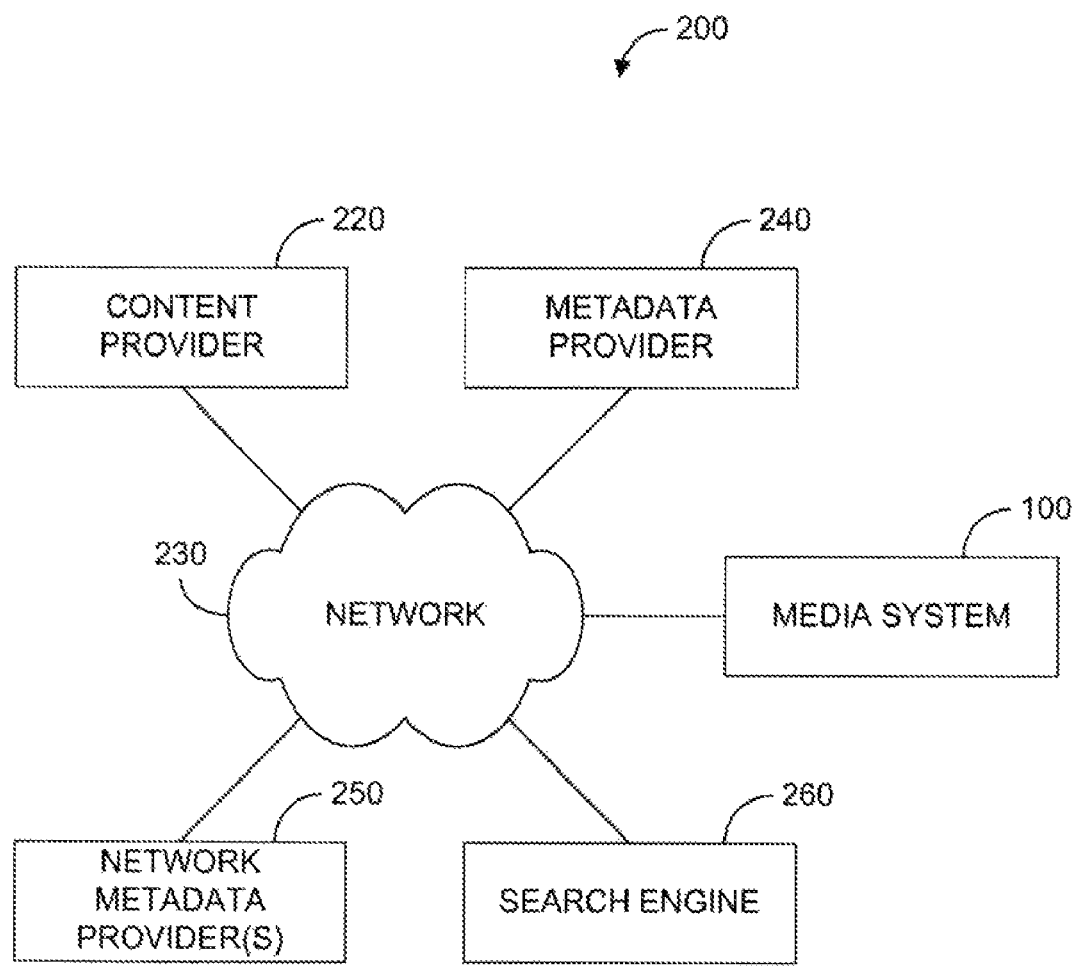
FIG. 2 is a block diagram illustrating an exemplary network including a media system.

FIG. 2 is a network diagram, showing an example implementation 200 of a media system 100. The media system(s) 100 can receive video content broadcast from a content provider 220 using a network 230. The media system 100 can also receive metadata from a metadata provider 240 using the network 230. The metadata received from the metadata content provider 240 can include a schedule for the content received from the content provider 220, as well as information about the content received from the content provider 220.

The schedule received from the metadata provider 240 can include a list of program titles associated with time slots for numerous channels received from the content provider 220. In some implementations schedule information can be provided, for example, for up to three weeks of future broadcast content, or up to any future period of time provided by a metadata provider 240.

The information about the broadcast content can include a number of information fields associated respectively with the various program titles. For example, information fields can include a rating (e.g., a Motion Picture Association of America (MPAA) rating), actors/actresses appearing in the movie, director, a summary description of the content, a critical rating. The information fields and an associated program title can be displayed to the user using the media system.

In some implementations, the media system 100 can receive input from a user to retrieve additional metadata content from a network metadata provider 250 based upon the user's input. In particular, the media system 100 can retrieve related metadata content based upon currently selected content (e.g., content currently being presented, title selected from an interactive program guide or condensed program guide, etc.). In other examples, the media system 100 can retrieve metadata based upon user input. The related metadata content can be retrieved by extracting or developing search terms from the metadata received from the metadata provider 240. Upon extracting/developing the search terms, the media system 100 can communicate with a search engine 260 to provide the search terms to the search engine 260. The search engine 260 can respond by, for example, sending a link to any related metadata content fund. Alternatively, the search engine 260 can be part of a metadata provider 250, or a web crawler built into the media system 100. The network metadata provider 250 can offer a user the opportunity to view additional metadata content using the media system 100.

The network 230 can take various forms, such as, for example, a cable television network, a packet switched network, a circuit switched network, etc. Further, the network 230 in various examples can include a number of sub-networks. Moreover, it is not necessary that the sub-networks have the ability to communicate with each other. For example, one of the sub-networks can be a public switched telephone network (PSTN), while another sub-network can be a cable television network, or a wireless communication network (e.g., a network under any of the Institute of Electrical and Electronics Engineers (IEEE) 802.11, cellular networks, microwave networks, etc.).

Figure 3:
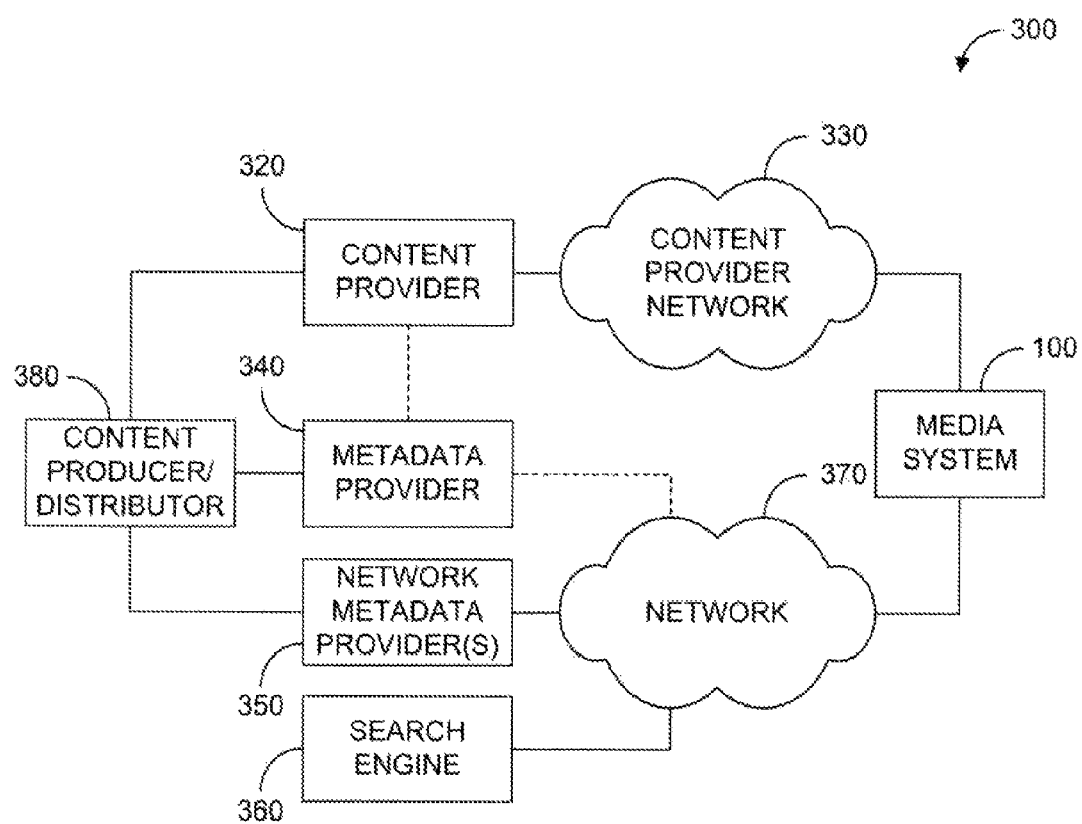
FIG. 3 is a block diagram illustrating another exemplary network including a media system.

As a further illustration of the broad disclosure of the types of networks that can be included in systems and methods disclosed herein, FIG. 3 is a block diagram illustrating another exemplary network including a media system 100. Media system 100 can be connected to a content provider 320 using a content provider network 330, and to commercial and other services 340-360 using a separate network 370.

In this implementation, the content provider 320 provides broadcast content to the media system 100 using the content provider network 330. The content provider network can be alternatively implemented using a number of different networks or network configurations, including a cable television network, a satellite network (such as direct broadcast satellite (DBS)), wireless networks, among many others. The broadcast content can be provided in a variety of different formats (analog or digital), including various coding schemes.

While the content provider 320 can produce and distribute original content, the content provider 320 typically operates as a last mile distribution agent for content producers/distributors 380. The content producers/distributors 380 can include, for example, various production companies that operate to produce and/or distribute television, movie or other video or audio content. The content producers/distributors 380 can use a variety of mechanisms to distribute content to various content providers.

The metadata provider 340 can be connected to the content provider 320 to receive schedule data for dissemination. Alternatively, the metadata provider 340 can receive the schedule information directly from the content producers/distributors 380 such as traditional network television producers/distributors (e.g., American Broadcasting Company (ABC), NBC, CBS, Fox, etc), or cable networks (e.g., ESPN, MTV, CNN, Comedy Central, HBO, Showtime, etc.) to receive schedule information. In some implementations, the metadata can be provided using the content provider 320 using the content provider network 330. In other implementations, the metadata can be provided to the media system 100 using a separate network 370, such as, for example, the internet.

The metadata content provider 350 operates to, among other things, provide metadata to users over the network 370. In some implementations, the network metadata provider 350 can provide the metadata content over a network 370 such as the internet. In other examples, the network metadata content provider 250 can provide content over a proprietary network, a phone network, a wireless network, etc., and combinations thereof. In some implementations, the network metadata content provider 350 can be user driven. For example, users can provide metadata content (e.g., facts about filming, actors, directors, etc.) to the metadata content provider 350.

The search engine 360 operates to enable searchers to search for a variety of data. In one implementations, the search engine 360 can be a proprietary search engine used to search for content from a metadata content provider 350 library of metadata content. In such an implementation, the search engine can be associated with or provided by the metadata content provider 350. In further implementations, the search engine 360 can operate to search from a number of metadata content providers, including, for example, iTunes, Amazon.com (available from Amazon.com, Inc., of Seattle, Wash.), NetFlix, IMDb, Movies.com (available from The Walt Disney Company, of Burbank, Calif.), etc. This can be done by searching known metadata content provider websites individually, or by searching for the content using a global-type search engine, such as, e.g., Google, available from Google Inc. of Mountain View, Calif.

Figure 4:
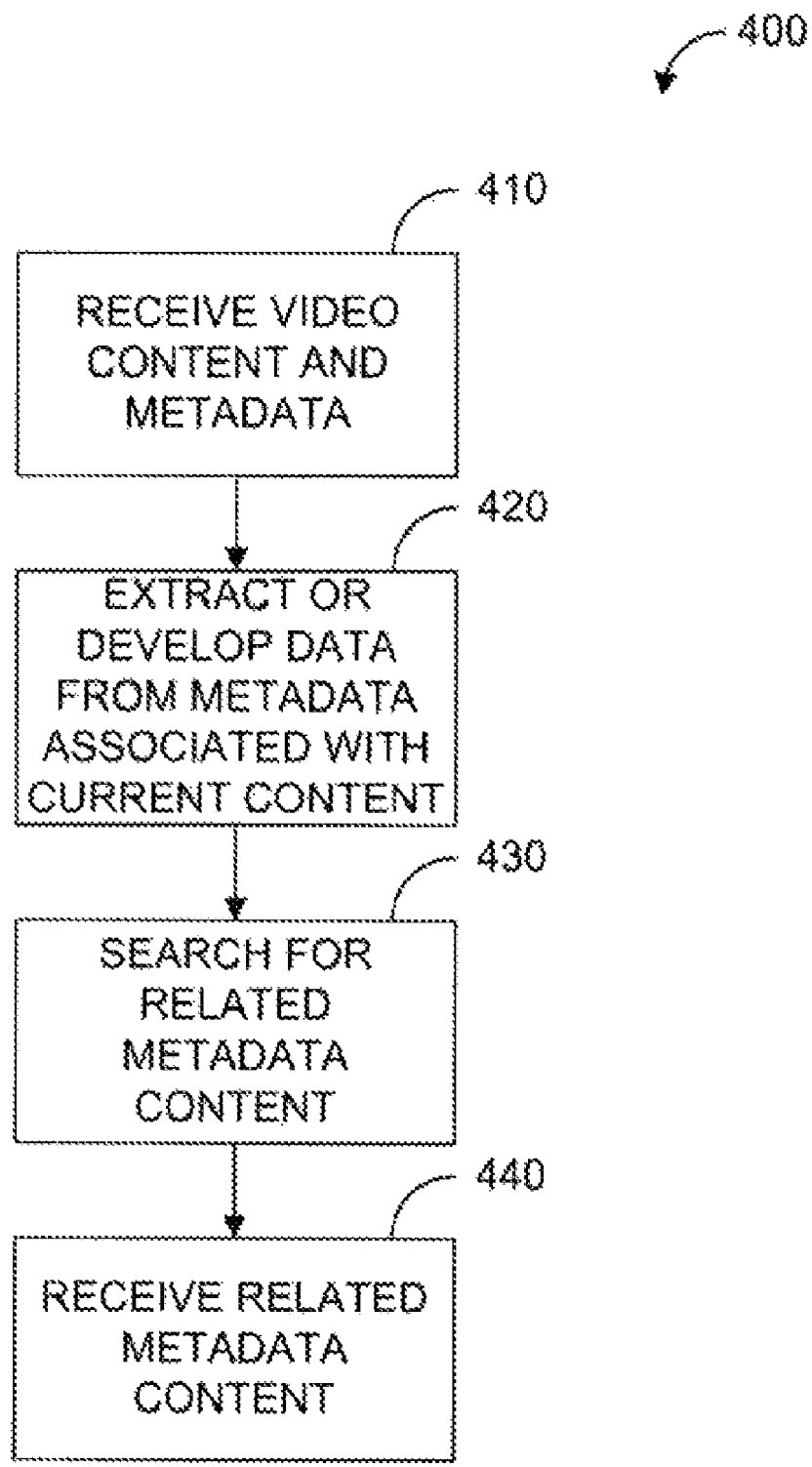
FIG. 4 is a flowchart illustrating an exemplary method for retrieving data for a media system.

FIG. 4 shows a method 400 for retrieving additional metadata content to a media system. The method 400 begins at step 410 by receiving video content and metadata. The video content can be provided through a number of mechanisms, including, for example, cable, satellite, wireless, etc. The metadata can be provided by a metadata provider, such as for example a third party metadata provider or the video content provider, and received for example, by the I/O device interface 125.

The method 400 then extracts or develops data from the metadata received from, for example, the metadata provider, as shown in step 420. For example, step 420 can be provided by the extraction engine 175 of FIG. 1. The extracted data can be based upon input received from the user. For example, in various implementations, the user can request more information about a currently selected title, trivia, biographies of people associated with the currently selected title, bonus footage, production stills (e.g., pictures of case & crew), critic reviews, etc. In one implementation, the actor and/or title information can be extracted from the metadata associated with the currently selected content. The currently selected content can be the video content that is currently being processed for presentation by the media system. Alternatively, the currently selected content can be the content that is currently selected using the user interface, for example, using an interactive program guide, a condensed program guide, or an information interface.

The method 400 uses the extracted data to search for additional metadata, as shown in step 430. As an example, step 430 can be provided by the metadata retrieval engine 180 of FIG. 1. As described above, additional metadata can be searched for in a number of different ways. For example, in some implementations, the user can select to search for additional program description, director information, biographies, bonus footage (deleted scenes, alternate endings, "making of" footage, theatrical trailers, etc.), trivia, user participation, commentaries, etc. The search can be performed, for example, on a variety of different metadata provider websites (iTunes, Amazon.com, movies.com, NetFlix, etc.), whereby the metadata provider can typically provide a search engine. Alternatively, the search can be performed using a single search engine to search a variety of different internet content (e.g., Google website, Yahoo! Search, AltaVista, etc.). In yet another alternatives, the metadata retrieval engine can include a web crawler and/or scraper used to harvest information from various metadata provider websites.

The method 400 receives related metadata content, as shown in step 440. As an example, the related metadata content can be received by the I/O device interface 125 of FIG. 1. The metadata content can be received at the media system 100 using a network connection. Alternatively, the metadata content can be directed through a content provider network. If the requested metadata content is video and/or audio content, the media system 100 can present the received related metadata content to the user upon receiving the metadata content either contemporaneously with the current content or otherwise. In further alternatives, metadata can be stored for later presentation to the user.

Figure 5:
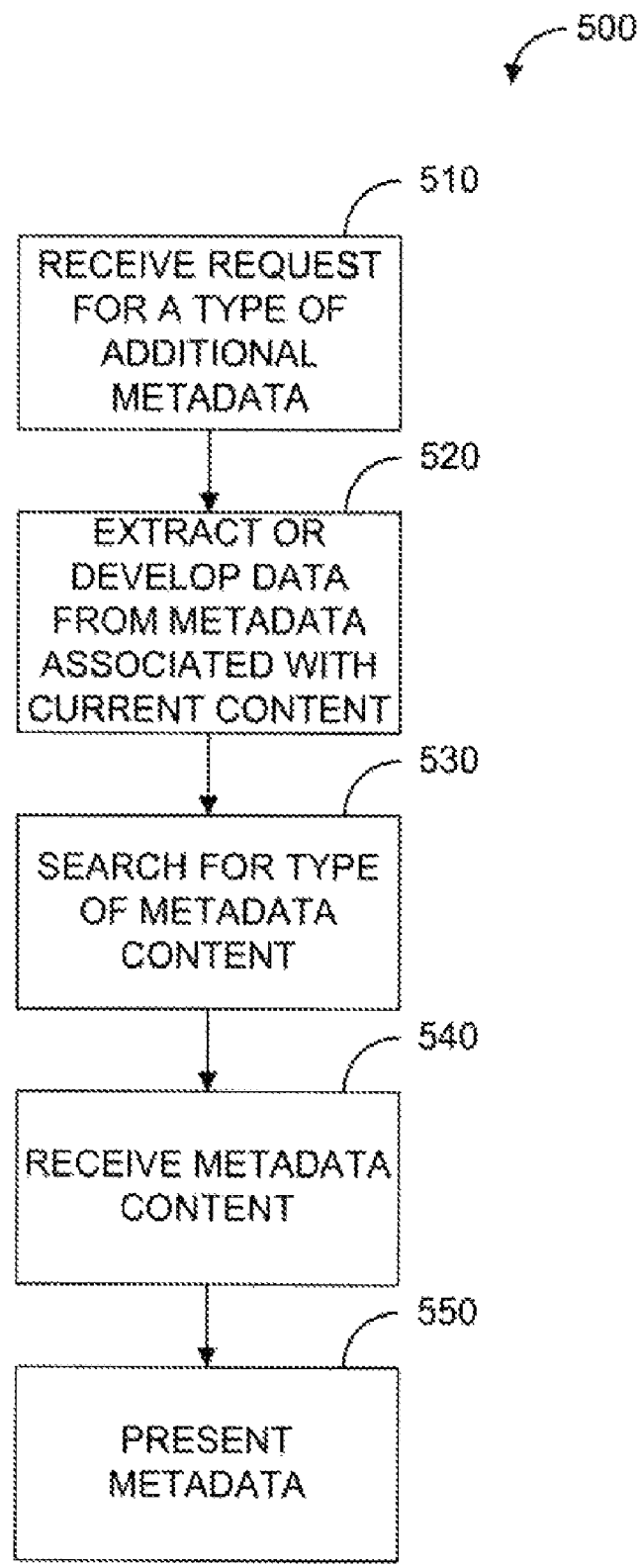
FIG. 5 is a flowchart illustrating an alternative exemplary method for retrieving data for a media system.

FIG. 5 shows a method 500 for retrieving metadata content to a media system. The method 500 begins at step 510 by receiving a request for additional metadata content. For example, the request for additional metadata content can be received using the remote control engine 130, or the I/O device interface 125. In example implementations the metadata content request can be received from a user of the media system. Alternatively, the request can be automatically generated. The additional metadata content can be provided using a number of media, including, for example, cable, satellite, wireless, etc. The metadata can be provided by a metadata provider, such as for example a third party metadata provider or the content provider.

The method 500 extracts/develops data from the received metadata, as shown in step 520. The extraction can be based upon input received from the user. Step 520, for example, can be provided by extraction engine 175 of FIG. 1, or metadata retrieval engine 180 of FIG. 1. For example, in various implementations, the user can request more information about a currently selected title, trivia, biographies of people associated with the currently selected title, bonus footage, production stills (e.g., pictures of case & crew)l, critic reviews, etc. The actor and/or title information can be extracted from the metadata associated with the currently selected content. The currently selected content can be the video content that is currently being processed for presentation by the media system. Alternatively, the currently selected content can be the content that is currently selected using the user interface, for example, using an interactive program guide, a condensed program guide, or an information interface.

The method 500 uses the extracted/developed data to search for additional metadata (e.g., based on the request received from the user), as shown in step 530. In various implementations, step 530 can be provided by the metadata retrieval engine 180 of FIG. 1. As described above, additional metadata can be searched for in a number of different ways. For example, in some implementations, the user can select to search for additional program description, director information, biographies, bonus footage (deleted scenes, alternate endings, "making of" footage, theatrical trailers, etc.), trivia, user participation, commentaries, etc. The search can be performed, for example, on a variety of different metadata provider websites (iTunes, Amazon.com, movies.com, NetFlix, etc.), whereby the metadata provider can typically provide a search engine. Alternatively, the search can be performed using a single search engine to search a variety of different internet content (e.g., Google website, Yahoo! Search, AltaVista, etc.). In yet further alternatives, the metadata retrieval engine can include a web crawler and/or scraper used to harvest information from various metadata provider websites.

The method 500 receives related metadata content, as shown in step 540. The metadata content can be received at the media system 100 using a network connection using, for example, the I/O device interface 125 of FIG. 1. Alternatively, the metadata content can be directed through a content provider network. If the requested metadata content is video and/or audio content, the media system 100 can present the received related metadata content to the user upon receiving the metadata content. Alternatively, the media system 100 can store the received metadata content in the data store for later presentation to the user.

The method 500 presents the metadata, as shown in step 550. For example, the metadata can be presented in step 550 by sending the metadata to the presentation engine 160 of FIG. 1. The metadata can be any of audio, video, text, or combinations thereof. Moreover, the metadata in some implementations can be interactive, allowing the user to answer questions by selecting from, for example, a multiple choice list. In further implementations, the metadata can be used to interact with the user and to allow the user to play games using the metadata content, for example, by choosing from among several different options and displaying content based upon the user selection.

Figure 6:
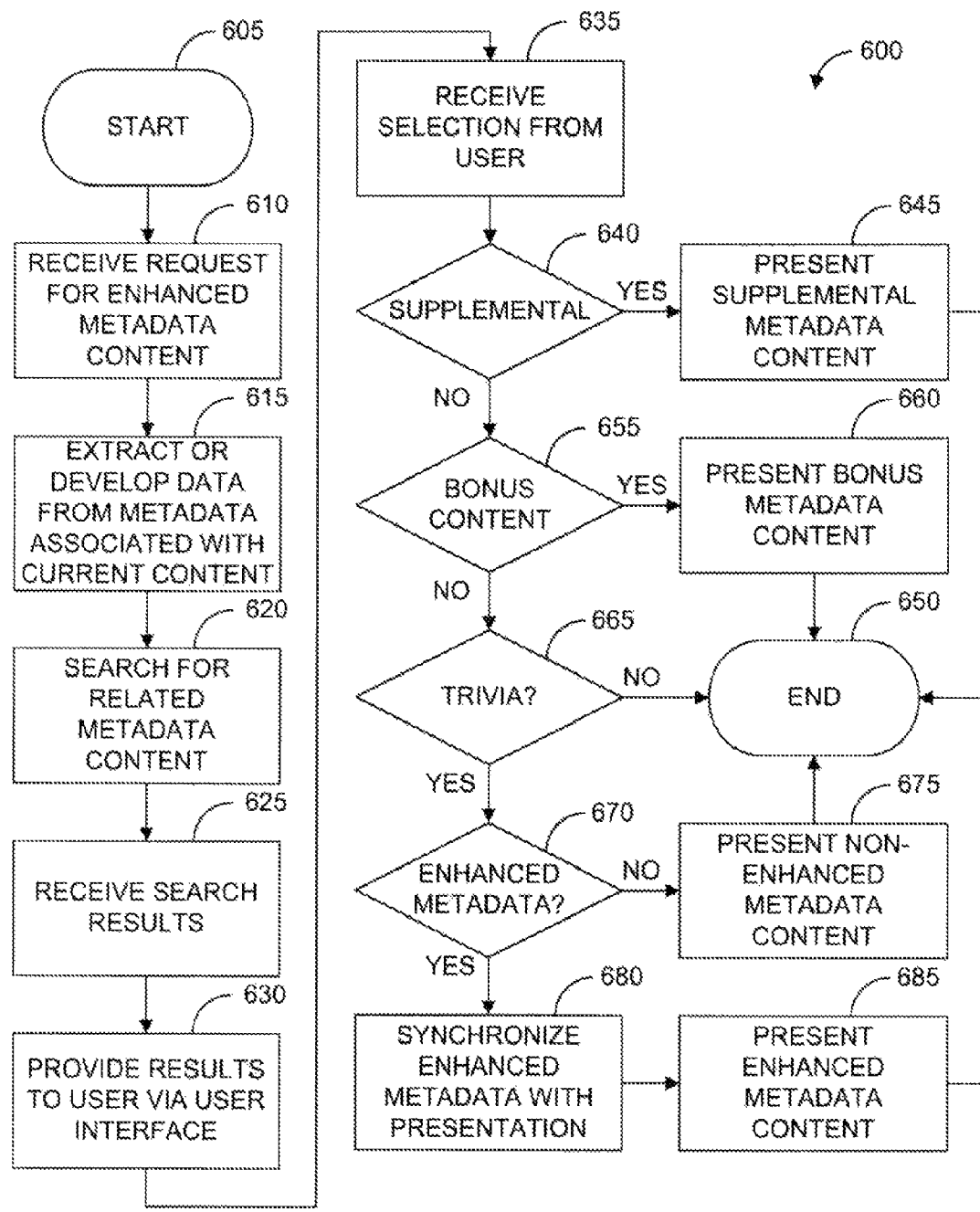
FIG. 6 is a flowchart illustrating an exemplary method for retrieving data for a media system.

FIG. 6 is a method 600 for retrieving related metadata content using, for example, a media system 100. The method 600 begins at start block 605. At step 610, the method 600 receives a request for related metadata content. As an example, the request can be received using an I/O device interface. The request can be related to currently selected or currently presented content. The content can be broadcast video content (e.g., cable, DBS, over-the-air, etc.) received from a content provider using a content provider network.

The method 600 continues at step 615, by extracting or developing data from the metadata associated with the current content. As an example, step 615 can be provided by the extraction engine 175 of FIG. 1 or the metadata retrieval engine 180 of FIG. 1. The metadata can be received from a metadata provider using a side-band, for example, of the content provider network or using another communications network (e.g., internet, wireless network, etc.). In one implementation, based upon user input, the user can select to extract data from among the metadata. The user input can include requesting related metadata for the content currently being presented by the media system. Alternatively, the user input can include requesting related metadata to a title selected from a user interface, such as, for example, an interactive program guide or a condensed program guide, among others.

The extracted data serves as search criteria for use with a search engine. Searching for metadata content related to the extracted/developed data (e.g., search criteria), is shown at step 620. For example, step 620 can be provided by the metadata retrieval engine 180 of FIG. 1. As noted above, this search can include searches for a variety of different content, including, for example: biographies, commentaries, trivia, bonus content, or interactive metadata.

The method 600 then receives the search results at step 625. For example, step 625 can be provided by the I/O device interface. The method 600 can then organize the search results and provide the search results to the user, as shown in step 630. As an example, step 630 can be provided by a user interface 145. The results can be provided in many different forms. For example, the results can be provided to the user in a form of a list. Alternatively, the results can be categorized and presented by category.

Upon outputting the results of the search to the user, the user interface can receive a selection from the user as shown in step 635. As an example, the selection step can be provided by the user interface 145. The selection step 635 can include a confirmation of the selection based upon the selection received from the user. The selection is then examined in step 640 to determine whether the user has selected to receive supplemental metadata (e.g. more information about the program). Step 640, for example, can be provided by the user interface 145. If the selection is for supplemental metadata, the method 600 retrieves supplemental metadata from, for example, the network and presents the data to the user as shown in step 645. As an example, step 645 can be provided by the metadata retrieval engine 180 in conjunction with the I/O device interface 125. The method 600 ends at step 650.

Returning to step 640, if the selection is not for supplemental metadata, the method 600 proceeds to step 655, where it is determined whether the selection is for bonus content. As an example, step 655 can be provided by the presentation engine 160. If the selection is for bonus content, the method 600 proceeds to step 660, where the bonus content is presented to the user. Step 660 can be provided, for example, by the presentation engine 180 in conjunction with the display device interface 115. The method 600 ends at step 650.

However, if the selection is not for bonus content, the method 600 proceeds to step 665, where it is determined whether the selection is for trivia content. As an example, step 665 can be provided by the presentation engine. If the selection is not for trivia content, the method 600 can end at step 650. If the selection is for trivia content, the method 600 determines whether the selection is for enhanced metadata (e.g., interactive trivia, pop-up trivia, etc.), as shown in step 670. As an example, step 670 can be provided by the presentation engine. If the selection is not for enhanced trivia, the method 600 proceeds to step 675, where non-enhanced trivia is retrieved and presented to the user using the media system. As an example, step 675 can be provided by the presentation engine.

If the selection is for enhanced trivia, the method 600 can synchronize the metadata to the presentation as shown in step 680. As an example, step 680 can be provided by the presentation engine. There are numerous ways to synchronize data to the currently displaying content. For example, the enhanced trivia metadata can include timing information that is roughly synchronized to the currently displayed content by examining the start time and end time of the currently displayed content, and estimating synchronization by matching the time differential between either of the start time or end time to the metadata timing information. Alternatively, the currently displayed broadcast content can include timing data that can be matched to metadata timing information. In yet further alternative implementations, the metadata content provider can provide an alternative feed that includes the enhanced trivia metadata as part of the content. In still further alternatives, a signature of a currently displayed frame can be derived an compared to a known signature of all of the content frames. The known signatures can be associated with timing information included in the metadata. Still further implementation for synchronization are possible.

The method 600 then presents synchronized content to the user in step 685. For example, the synchronized content can be presented to the user using the presentation engine 160 in conjunction with the display device interface 115.

Figure 7:
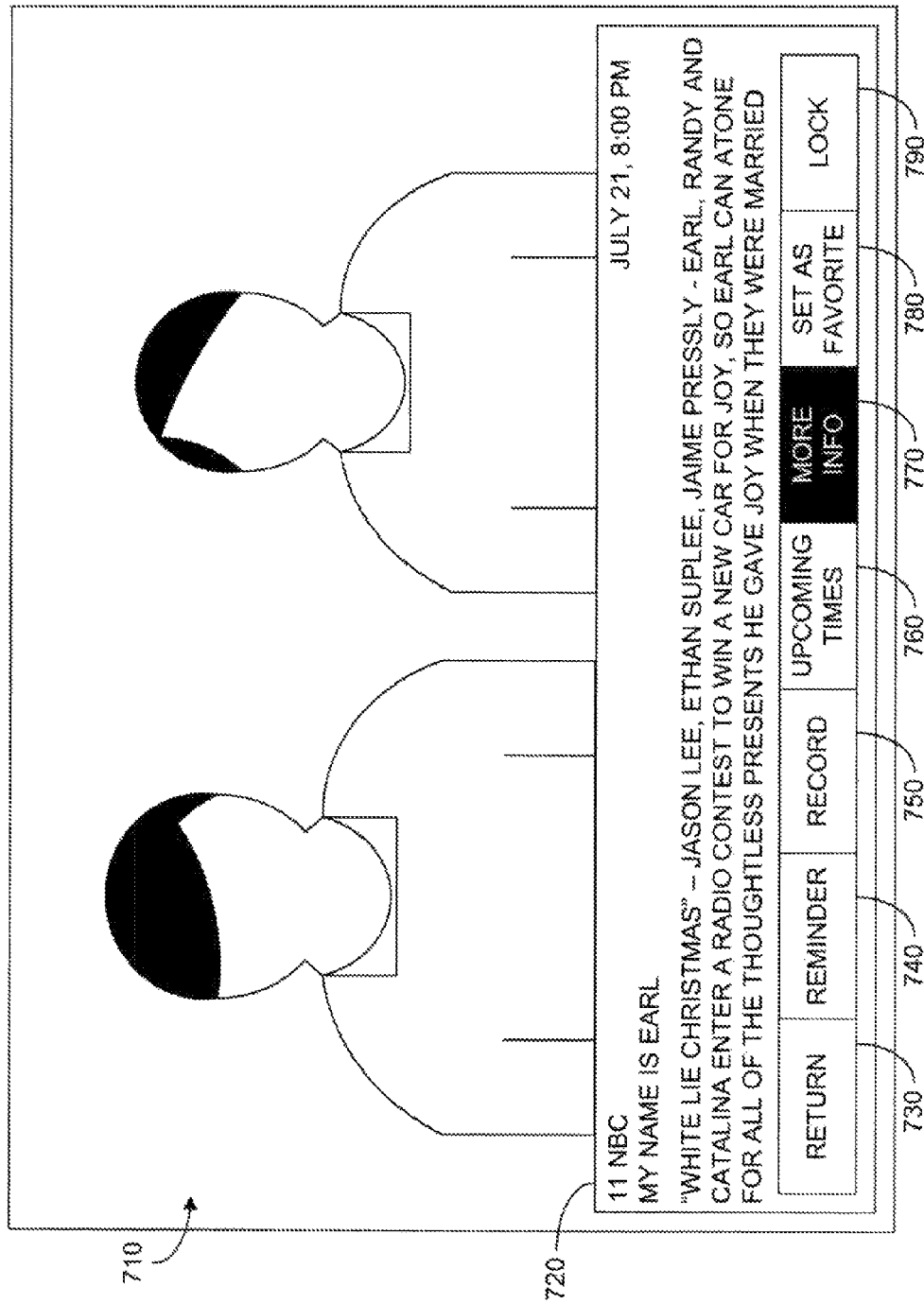
FIG. 7 is a screen shot illustrating an example of a user interface for a media system having a related content search option.

FIG. 7 depicts an example screen shot 700 displaying a content presentation 710 and an information interface 720. In this example implementation, the information interface 720 includes a number of button representations 730-790. In various implementations of the media system 100, a browsing engine 155 in conjunction with a user interface engine 145 can generate the information interface 720 and the button representations 730-790.

The button representations, in some implementations, can include a "return" button representation 730, a "reminder" button representation 740, a "record" button representation 750, an "upcoming times" button representation 760, a "more info" button representation 770, a "favorite" button representation 780, and a "lock" button representation 790. The "return" button representation 730, upon selection, can cause the user interface to display the previous screen (e.g., the content presentation, an interactive program guide, etc.). The "reminder" button representation 740, upon selection, can cause the user interface, for example, to display a list of reminders set by the user and recorded by the media system. The "record" button representation 750, upon selection can cause the user interface to record the currently selected content (e.g., the currently displayed program) to a data store. The "upcoming times" button representation 760, upon selection, can cause the user interface to display a list of upcoming times for the currently selected content (e.g., the currently displayed program) based upon a search of metadata stored in the data store. The "more info" button representation 770, upon selection, can cause the media system 100 to perform a search for related metadata content (e.g., trivia, biographies, commentaries, bonus footage, etc.) from a network (e.g., the internet), and to display a list of related content responsive to the search results received. The "favorite" button representation 780, upon selection, allows a user to set a currently selected channel as a favorite. The "lock" button representation 790, upon selection, allows a user to set a currently selected channel to be locked, so as to inhibit a user from accessing the channel without providing credentials (e.g., a password).

Figure 8:
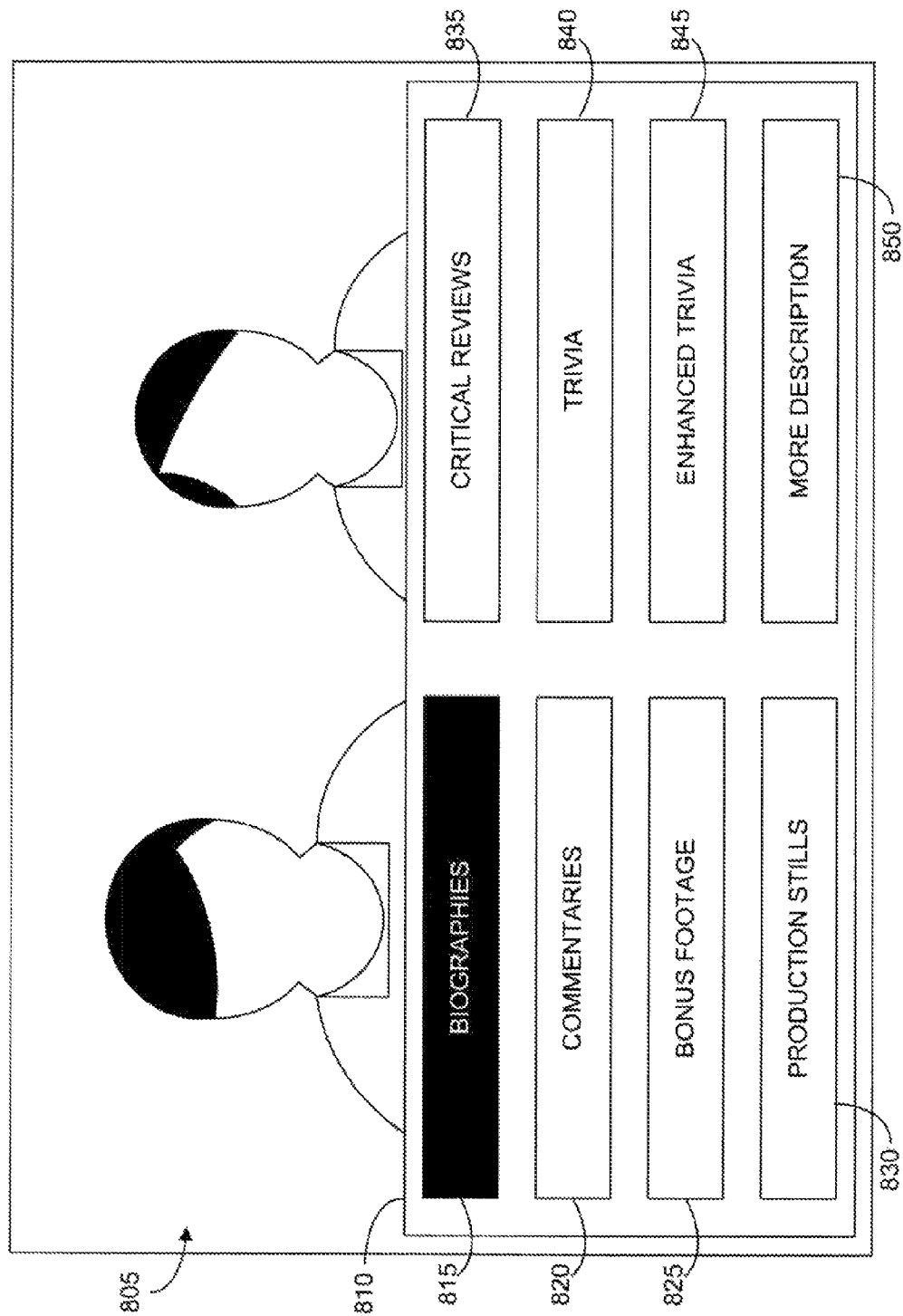
FIG. 8 is a screen shot illustrating an example of a user interface having a number of search templates which the user can select to cause the media system to perform a search.

FIG. 8 depicts an example screen shot 800 displaying a content presentation 805 and an menu interface 810. The menu interface 810 includes a number of button representation 815-850, which can be selectable by the user. In various implementations of the media system 100, a browsing engine 155 in conjunction with a user interface engine 145 can generate the menu interface 810 and the button representations 815-850.

The button representations 815-850 can include a number of search templates, which can be used by the extraction engine 175 and metadata retrieval engine 180 to extract search criteria from the metadata and to search for related metadata content. In various example implementations, the search templates can include a "biographies" button representation 815, which upon selection can cause the extraction engine to extract the actors from the metadata associated with the currently selected content (e.g., the content currently being presented to the user). The metadata retrieval engine 180 can then execute a search template to search a network for biographical content.

The extraction engine 175 can be alternatively configured to extract the title from the metadata. The metadata retrieval engine 180 can then search for metadata related to the extracted title (e.g., additional actors, directors, producers, writers, and any other cast & crew). The extraction engine 175 can use the retrieved data to extract all people associated with the content (e.g., a movie), and instruct the metadata retrieval engine 180 to retrieve biographical information related to any or all of the people associated with the content.

Another example of a button representation that can be included in some implementations is a "commentaries" button representation 820. Upon selection, the "commentaries" button representation can cause the extraction engine 175 to extract content title information from the metadata associated with the currently selected content (e.g., the content currently being presented to the user). The search template can allow a user to select from among types of commentaries searched (e.g., director's commentary, actors commentary, etc.), and the metadata retrieval engine 180 can search for a targeted type of commentary.

The search templates can also include a "bonus footage" button representation 825, which upon selection can cause the extraction engine 175 to extract a program title from the metadata associated with the currently selected content (e.g., the content currently being presented to the user). The metadata retrieval engine 180 can then execute a search template to search a network for additional content (e.g., deleted scenes, alternative endings, interviews, etc.) using the extracted program title information as a search criteria. The search template can further allow a user to select from among multiple additional content options.

The search templates can also include a "productions stills" button representation 830, which upon selection can cause the extraction engine 175 to extract a title from the metadata associated with the currently selected content (e.g., the content currently being presented to the user). The metadata retrieval engine 180 can then execute a search template to search a network for related content using the extracted title information as a search criteria. The search template can further allow a user to select from among multiple photographs.

The search templates can also include a "critical review" button representation 835, which upon selection can cause the extraction engine 175 to extract, for example, title information from the metadata associated with the currently selected content (e.g., the content currently being presented to the user). The metadata retrieval engine 180 can then execute a search template to search a network for critic's reviews using the extracted program title information as a search criteria.

The search templates can also include a "trivia" button representation 840, which upon selection can cause the extraction engine 175 to extract program title information from the metadata associated with the currently selected content (e.g., the content currently being presented to the user). The metadata retrieval engine 180 can then execute a search template to search a network for trivia content using the extracted program title information as a search criteria.

The search templates can also include an "enhanced trivia" button representation 845, which upon selection can cause the extraction engine 175 to extract a title from the metadata associated with the currently selected content (e.g., the content currently being presented to the user). The metadata retrieval engine 180 can then execute a search template to search a network for enhanced trivia content using the extracted title information as a search criteria. The enhanced trivia metadata can include, for example, pop-up trivia items, interactive trivia menus, etc.

The search templates can also include a "more description" button representation 850, which upon selection can cause the extraction engine 175 to extract a title from the metadata associated with the currently selected content (e.g., the content currently being presented to the user). The metadata retrieval engine 180 can then execute a search template to search a network for different summary descriptions of the currently selected content using the extracted program title information as a search criteria.

In various implementations, the search template can have predetermined knowledge regarding a number of websites which compile information about content. These websites can be searched using any of a number of different searching mechanisms, including, for example, a web crawler or a web scraper to automatically browse the predetermined websites for different summary descriptions associated with the extracted program title information. Alternatively, the extraction engine can use a search engine associated with the site or operating independently from the site to perform a search for different biographies, commentaries, bonus footage, production stills, critical reviews, trivia, enhanced trivia, or summary descriptions associated with the extracted program title information.

Figure 9:
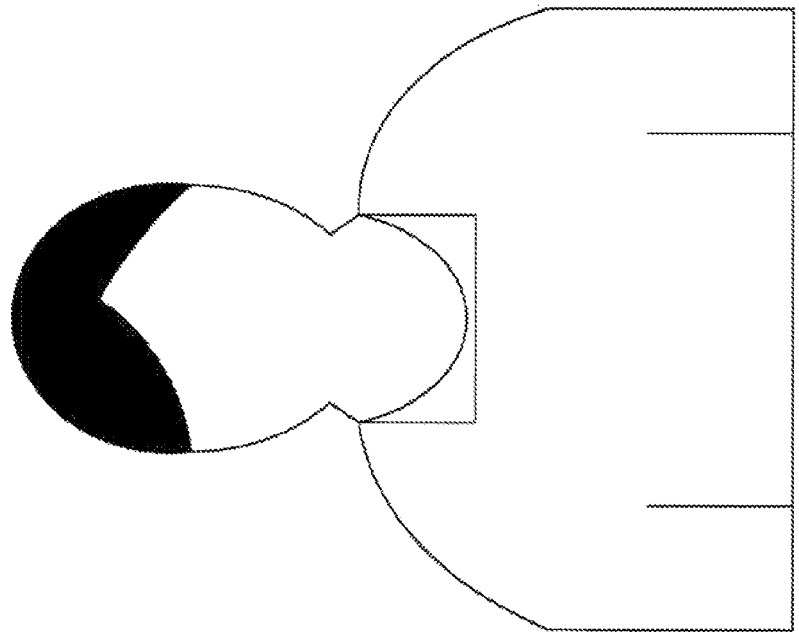
FIG. 9 is a screen shot illustrating an example of a user interface displaying biographical content to the user upon receiving a request from the user.

FIG. 9 depicts an example screen shot 900 displaying a presentation 905 and an menu interface 910 displaying biographical metadata to the content displayed in FIGS. 7 and 8, and based upon the selection of a "biographies" button representation from the menu interface of FIG. 8. While the presentation 905 in this example is hidden behind the menu interface 910, in other examples, the menu interface 910 may be collapsed or otherwise enable viewing of part or all of the presentation 905. The menu interface 910 can include, for example one or more pictures as well as textual biographical information about a selected person (e.g., actor, actress, director, writer, producers, etc.).

The menu interface 910 can also include navigation button representations 915-925. The navigation button representations 915-925 can include: a "return" button representation 915, allowing the user to return to the previous menu upon selection; a "next actor" button representation 920, allowing the user to skip to the biography of another actor in the presentation upon selection; a "more" button representation 925, allowing the user to view more biographical information about a currently selected person, upon selection. In various implementations of the media system 100, a browsing engine 155 in conjunction with a user interface engine 145 can generate the menu interface 910 and the navigation button representations 915-925.

In one implementation, among many others, the user can highlight a navigation button using a traditional up and down arrow button on the remote control or another media system 100 interface. Alternatively, a rotational input device can be used, such that the user interfaces with the remote control by moving a finger around the rotational input device (e.g., a touch actuated rotational input device). Upon highlighting the desired show representation 915-925, the user can press a select button (e.g., enter button) to select the currently highlighted navigation button representation.

Figure 10:
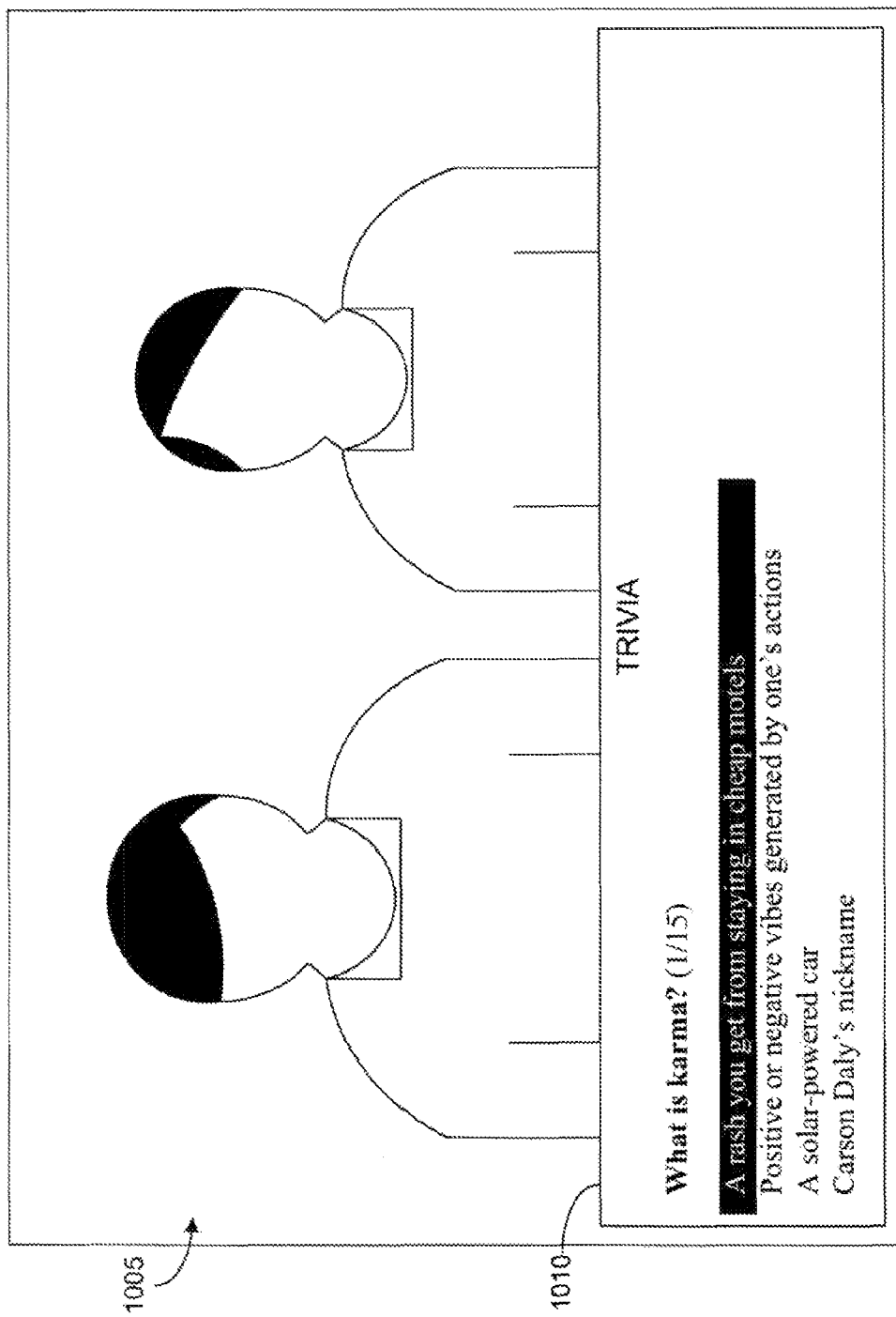
FIG. 10 is a screen shot illustrating an example of a user interface displaying interactive trivia content to the user upon receiving a request from the user.

FIG. 10 depicts an example screen shot 1000 displaying a presentation 1005 and an trivia interface 1010 displaying interactive trivia metadata related to the content displayed in FIGS. 7 and 8, and based upon the selection of an "enhanced trivia" button representation from the menu interface of FIG. 8. While the presentation 1005 in this example is hidden behind the trivia interface 1010, in other examples, the trivia interface 1010 may be collapsed or otherwise enable viewing of part or all of the presentation 1005. The trivia interface 1010 can include, for example multiple choice trivia questions about a currently selected content.

The trivia interface 1010 can allow the user to play a trivia game about the currently selected content, by selecting from a number of displayed answers. In one implementation, among many others, the user can highlight any of the multiple choice answers using a traditional up or down arrow button on the remote control or another media system 100 interface. Alternatively, a touch actuated rotational input device can be used, such that the user interfaces with the remote control by moving a finger around the rotational input device. Upon highlighting the desired answer representations, the user can press a select button (e.g., enter button) to select the currently highlighted answer representation.

Figure 11:
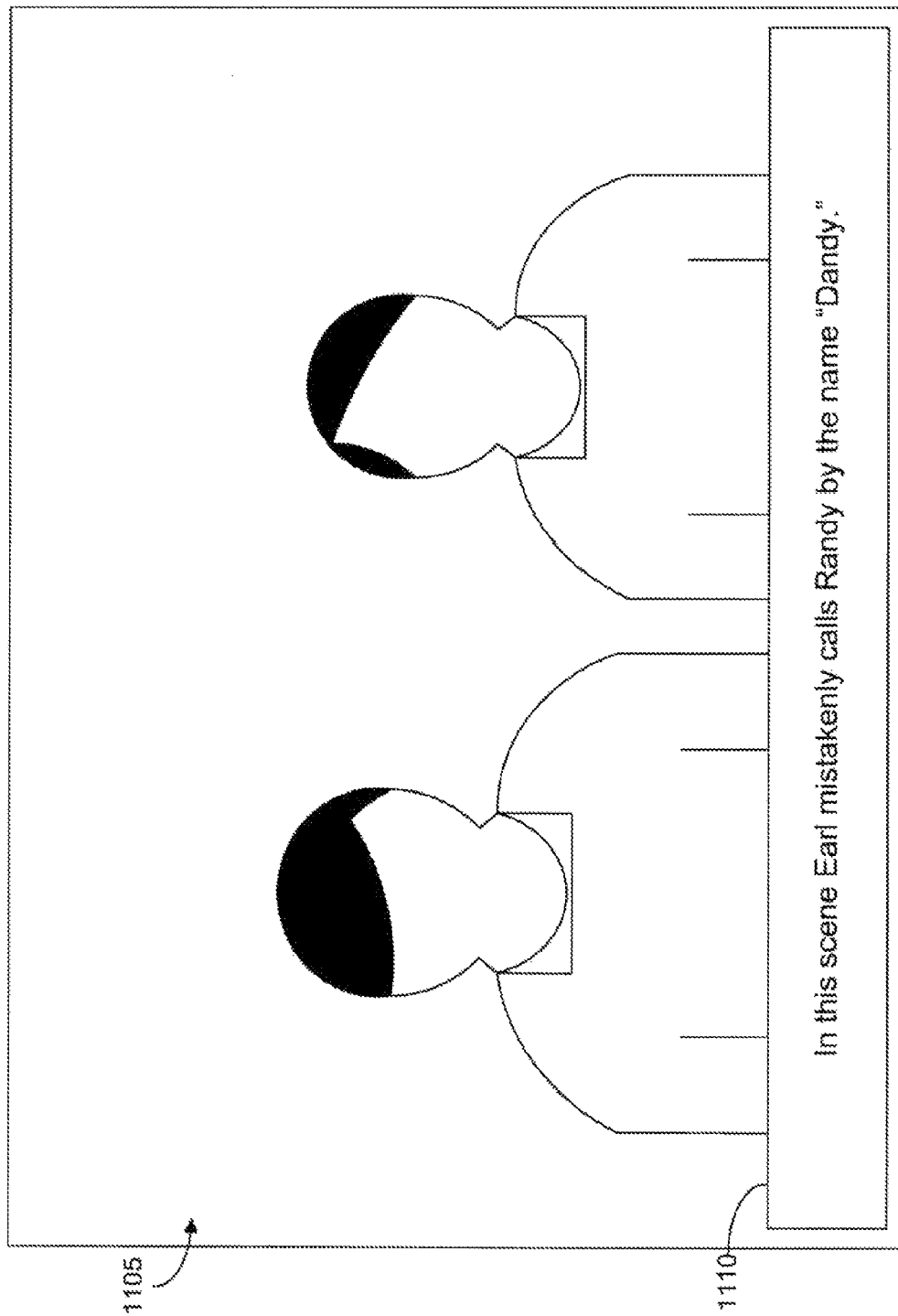
FIG. 11 is a screen shot illustrating an example of a user interface displaying pop-up trivia content to the user upon receiving a request from the user.

FIG. 11 depicts an example screen shot 1100 displaying a presentation 1105 and an pop-up trivia interface 1110 displaying synchronized trivia metadata related to the content displayed in FIG. 7 and 8, and based upon the selection of an "enhanced trivia" button representation from the menu interface of FIG. 8. While the presentation 1105 in this example is hidden behind the pop-up trivia interface 1110, in other examples, the trivia interface 1110 may be collapsed or otherwise enable viewing of part or all of the presentation 1105. As an example, substantial synchronization can be provided by the presentation engine 160 of FIG. 1. The pop-up trivia interface 1110 can include, for example trivia tidbits about the currently presented screen. In various implementations, substantial synchronization can be done by examining the start time associated with the content based on the metadata information, inspecting time stamps associated with the pop-up trivia content, and matching the presented trivia to a current delta time relative to the start time based upon the pop-up trivia time stamps.

In alternative implementations, the enhanced metadata can include substantially identical content provided by the metadata provider, therefore allowing the metadata to be synched to the content with greater precision. In still further alternative implementations, the media system 100 can include a signature identification engine allowing the media system 100 to identify a frame of the content, and synchronize the pop-up trivia content to the presentation content upon matching the frame information. In yet further alternative implementations, the video content itself can include timing information, and the metadata can include similar timing information, allowing the media system 100 to synchronize the video content and the metadata. The pop-up trivia interface 910 can be turned on or off by receiving an exit command from a user, for example, through an interactive program guide, an information interface, or an "exit" or "return" button, for example, on a media system 100 input device (e.g., a remote control).

Systems and methods disclosed herein may use data signals conveyed using networks (e.g., local area network, wide area network, internet, etc.), fiber optic medium, carrier waves, wireless networks, etc. for communication with one or more data processing devices (e.g., media systems 100). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit or code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A media system, comprising:
    a video input operable to receive video content;
    a metadata input operable to receive metadata from a metadata provider, the metadata being associated with the video content;
    a network interface operable to pull requested data from a network;
    a search engine interface operable to extract data from the metadata based upon user input, search the network for data related to the extracted data, and to use the network interface to pull the related data from the network;
    a control device operable to read timing data included in the related data; and
    a signature identification engine operable to:
        deriving a signature of a displayed frame of the video content;
        access an association of timing data and known signatures of frames of the video content, the association specifying a respective time for each known signature; and
        synchronize the related data to the video content based on the signature of the displayed frame of the video content, the timing data included in the related data, and the association of timing data and known signatures, the synchronizing comprising:
            comparing the signature of the currently displayed frame of the video content to the known signatures of frames;
            identifying a known signature of a frame that matches the signature of the displayed frame of video content;
            identifying the time associated with the identified known signature;
            determining whether the time associated with the identified known signature matches a time specified by the timing data included in the related data; and
            displaying the related data in substantial synchronization with the displayed frame of video content in response to determining that the time associated with the identified known signature matches a time specified by the timing data included in the related data.

2. The system of claim 1, wherein the related data includes additional metadata that supplements the metadata received from the metadata provider.

3. The system of claim 1, wherein the related data is provided by a collaborative website whereby members of the website provide metadata content which is associated with video content or metadata.

4. The system of claim 3, wherein the video content is broadcast content provided by a broadcast content provider and the collaborative website is operated by the broadcast content provider.

5. The system of claim 1, wherein the related data comprises trivia associated with video content.

6. The system of claim 1, further comprising one or more network search templates, each of the one or more network search templates defining at least a portion of data to be extracted from the metadata and to be used in searching for related data by the search engine interface.

7. The system of claim 6, wherein the system is operable to receive a selection from a user of one or more of the network search templates, and the search engine interface is operable to cause a search to be performed based upon the selection.

8. The system of claim 6, further comprising a menu interface operable to receive the related data from the network interface, and to prompt the user to select from among related data, the menu interface being further operable to receive a selection and to cause at least a portion of the related data to be displayed to the user based upon the selection.

9. The system of claim 6, wherein the network search templates include instructions that when processed by the search interface result in the extraction of one or more of a title, a genre, one or more actors, a director, a writer, or a producer from the metadata.

10. The system of claim 9, wherein upon extracting data from the metadata, the search engine interface is operable to receive a selection from a user using a user interface of one or more of the network search templates, the selection indicating whether the user desires more information about the title, the genre, one or more actors, the director, the writer or the producer.

11. The system of claim 1, wherein the related data comprises one or more of a third party review, biographies, production stills, or cast pictures.

12. The system of claim 1, wherein the related data comprises bonus features associated with the video content.

13. The system of claim 12, wherein the bonus features comprise a director's commentary to be played in approximate synchronization with the video content.

14. The system of claim 1, wherein the related data is received using an RSS feed.

15. A method, comprising:
    receiving metadata associated with currently selected video content;
    extracting search parameters from the received metadata;
    searching a network for related data based upon the extracted search parameters;
    receiving the related data;
    reading timing data included in the related data;
    deriving a signature of a displayed frame of the video content;
    accessing an association of timing data and known signatures of frames of the video content, the association specifying a respective time for each known signature; and
    synchronizing the related data to the video content based on the signature of the frame of the video content, the timing data included in the related data, and the association of timing data and known signatures, the synchronizing comprising:

comparing the signature of the displayed frame of the video content to the known signatures of frames;

identifying a known signature of a frame that matches the signature of the displayed frame of video content;

identifying the time associated with the identified known signature;

determining whether the time associated with the identified known signature matches a time specified by the timing data included in the related data; and displaying the related data in substantial synchronization with the displayed frame of video content in response to determining that the time associated with the identified known signature matches a time specified by the timing data included in the related data.

16. The method of claim 15, further comprising receiving user input specifying a type of related data for which to search.

17. The method of claim 15, wherein the related data includes additional metadata that supplements the metadata received from a metadata provider.

18. The method of claim 15, wherein the related data is provided by a collaborative website whereby members of the website provide metadata content which is associated with video content or metadata.

19. The method of claim 18, wherein the currently selected video content is broadcast content provided by a broadcast content provider and the collaborative website is operated by the broadcast content provider.

20. The method of claim 15, wherein the related data comprises trivia associated with video content.

21. The method of claim 15, further comprising searching a network based upon one or more network search templates, the network search templates defining at least a portion of data to be extracted from the metadata and to be used in searching for supplemental program data.

22. The method of claim 21, further comprising:
receiving a selection from a user of one or more of the network search templates; and
causing a search to be performed based upon the selection.

23. The method of claim 21, further comprising:
receiving the related data from a network interface;
prompting the user to select from among related data;
receiving a selection; and
causing at least a portion of the related data to be presented to the user based upon the selection.

24. The method of claim 21, wherein the network search templates include instructions that when processed by a search engine result in the extraction of one or more of a title, a genre, one or more actors, a director, a writer, or a producer.

25. The method of claim 24, further comprising receiving a selection from a user of one or more of the network search templates, the selection indicating whether the user desires more information about the title, the genre, one or more actors, the director, the writer or the producer.

26. The method of claim 15, wherein the related data comprises one or more of a third party review, biographies, production stills, or cast pictures.

27. The method of claim 15, wherein the related data comprises bonus features associated with the video content.

28. The method of claim 27, wherein the bonus features comprise a director's commentary to be played in approximate synchronization with the video content.

* * * * *

UNITED STATES PATENT AND TRADEMARK OFFICE
CERTIFICATE OF CORRECTION

PATENT NO.        : 7,865,927 B2
APPLICATION NO.   : 11/549103
DATED             : January 4, 2011
INVENTOR(S)       : Rainer Brodersen et al.

It is certified that error appears in the above-identified patent and that said Letters Patent is hereby corrected as shown below:

On the face page, in field (57), in column 2, line 4, delete "the the" and insert -- the --, therefor.

In column 1, line 11, delete "mode" and insert -- model --, therefor.

In column 2, line 54, delete "of an" and insert -- or an --, therefor.

In column 3, line 50, delete "Tribute" and insert -- Tribune --, therefor.

In column 3, line 51, delete "Chicago, Ill.," and insert -- Chicago, IL, --, therefor.

In column 4, line 65, delete "example," and insert -- examples, --, therefor.

In column 5, line 8, delete "descriptions." and insert -- descriptions, --, therefor.

In column 5, line 46, delete "diagram," and insert -- diagram --, therefor.

In column 6, line 18, delete "fund." and insert -- found. --, therefor.

In column 7, line 12, delete "250" and insert -- 350 --, therefor.

In column 7, line 51, delete "case" and insert -- cast --, therefor.

In column 8, line 10, delete "another" and insert -- further --, therefor.

In column 8, line 46, delete "case" and insert -- cast --, therefor.

In column 10, line 64, after "information" insert --, thereby allowing any metadata to be synchronized to the presentation based upon timing information --.

Signed and Sealed this
Fifteenth Day of November, 2011

David J. Kappos
*Director of the United States Patent and Trademark Office*

CERTIFICATE OF CORRECTION (continued)
U.S. Pat. No. 7,865,927 B2

In column 10, lines 64-65, delete "implementation" and insert -- implementations --, therefor.

In column 11, lines 44-45, delete "representation" and insert -- representations --, therefor.

In column 12, line 36, delete "review"" and insert -- reviews" --, therefor.

In column 13, line 44, delete "up and" and insert -- up or --, therefor.

In column 15, line 3, delete "or code," and insert -- of code, --, therefor.